United States Patent Office 3,498,197
Patented Mar. 3, 1970

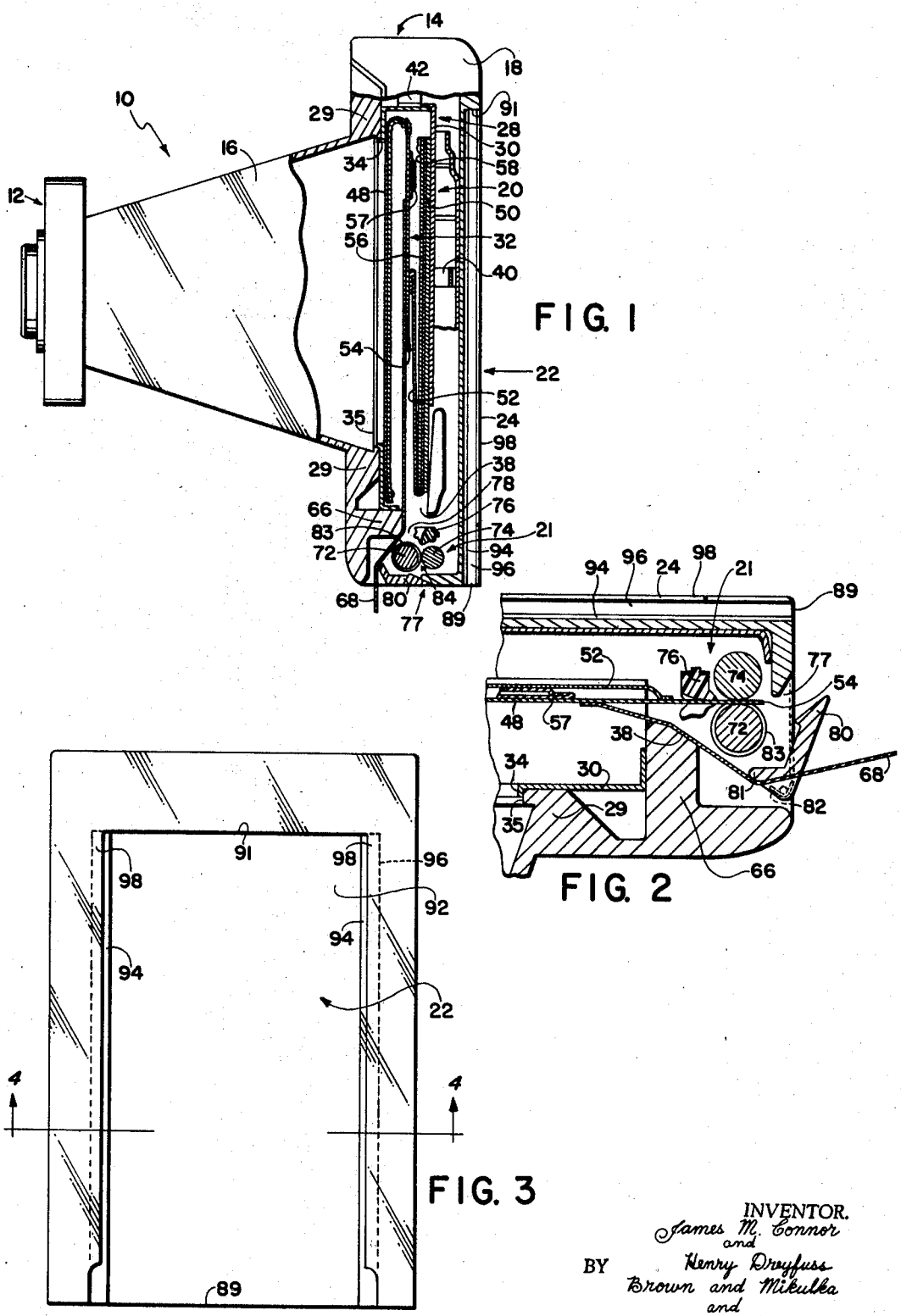

3,498,197
SELF DEVELOPING CAMERA TEMPERATURE CONTROL
James M. Conner, Glendale, and Henry Dreyfuss, South Pasadena, Calif., assignors to Polaroid Corporation, Cambridge, Mass., a corporation of Delaware
Filed Sept. 5, 1967, Ser. No. 665,434
Int. Cl. G03b 17/50
U.S. Cl. 95—13                                    5 Claims

ABSTRACT OF THE DISCLOSURE

A photographic camera records and developes images according to the diffusion transfer development process. The photographic products used in the process are designed for the production of color prints in temperatures at or above a predetermined level. A heat sink is provided for use with the camera to raise the environmental temperature of the photographic products, during the development process, to the predetermined level when the temperature in the location where photographs are being produced is below such level. A pair of opposed channels securely mount the heat sink upon the camera body and store the heat sink when it is not in use.

Brief summary of the invention

This invention contemplates a photographic camera adapted to record and develop photographic images in color, for example, by the diffusion transfer process. The camera incorporates a lens and shutter assembly, means defining a focal plane in which photosensitive sheet material is mounted during photographic exposure, and means to facilitate photographic development of photographic materials usable in the camera upon advance and removal of the materials from the camera subsequent to photographic exposure. The photographic materials are designed for development at or above a predetermined temperature level and, since the camera is portable, the photographic materials are subject to development in the location where exposure is produced. The location may, however, be characterized by a temperature below the aforesaid predetermined level. In this circumstance, means is provided to create an environment for the developing materials which is characterized by a temperature at or above the predetermined level. An inexpensive means which has been found to perform well, embodies a heat sink comprising a pair of metal plates hingedly attached along one edge. The heat sink is commonly referred to as a "cold clip" and will hereafter be referred to as such. The cold clip should be carried with the camera when there is a possibility of photographs being produced in locations having a temperature below the predetermined level. When usage is anticipated, prior to the time for actual usage, the cold clip is placed in an inside pocket of the photographer where it is warmed. Subsequent to exposure, the exposed photographic materials are removed from the camera and the development process begins, as will hereafter be explained. The photographic materials are placed between the warmed plates, to raise their temperature to the aforesaid predetermined temperature. After the time required for development, the photographic materials are removed from between the plates of the cold clip.

When not in use, the cold clip must be stored for easy and convenient transportation with the camera, in a location from which it may be conveniently removed for use. Thus, the cold clip is best stored on the camera body itself. According to this invention, the camera is provided with means for storing the cold clip which comprises a pair of channels spaced apart and oriented to receive and securely retain edge portions of the cold clip plates.

Brief description of the drawings

FIGURE 1 is a partially broken away side view of a photographic camera embodying the apparatus of this invention;

FIG. 2 is an enlarged view, in cross section, of a portion of the camera of FIGURE 1, showing its function in relation to photographic materials usable therein;

FIG. 3 is a rear view of the camera of FIGURE 1;

Detailed description

Reference will now be made to FIGURE 1. Camera 10 includes lens and shutter assembly 12, camera back 14, and light tight enclosure 16 which encloses lens and shutter assembly 12 and camera back 14.

Figure 6:
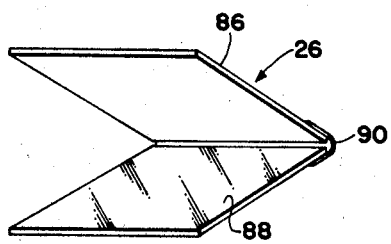
FIG. 6 is a perspective view of a preferred cold clip usable with the apparatus of this invention.

Back 14 includes door 18 to provide access to the interior of the camera, means 20 for locating photographic film in a focal plane during exposure, means 21 for facilitating advance and removal of the film from the camera back subsequent to exposure to initiate the development process, and structure 22 on door 18 defining channels 24 for receiving and storing cold clip 26, shown in FIG. 6.

Means 20 supports film pack 28 which, when properly positioned within camera back 14, locates photosensitive material 48 in the focal plane of the camera. The film pack is held in position by partition 29, springs 40 and 42, and projection 66. Partition 29 forms aperture 34 to permit the passage of light from the exposure aperture to the focal plane.

Process initiating apparatus 21 includes front pressure roll 72, rear pressure roll 74, margin engaging and compressing means 76, guide portion 78 of projection 66 and pivotal exit aperture closure means 80 having a torsion spring 82 (FIG. 2) biasing it to the closed position. Pressure rolls 72 and 74 are normally spaced slightly apart by flanges 83 to provide slot 84 which allows passage of film assembly leader 54 therethrough.

The film pack 28 comprises container 30 which releasably holds a plurality of film assemblies 32 (one only being shown), and has formed therein a frontal exposure aperture 34 and an end aperture 38 for withdrawal of each film assembly. Frontal aperture 34 is aligned with aperture 35 when the film pack is positioned in the camera. The film pack includes pressure plate 44 and a spring means, not shown, extending from the rear wall of container 30 and bearing upon rearwardly extending side portions of the pressure plate. Photosensitive sheet 48 is positioned foremost in the container forwardly of pressure plate 44, with its emulsion side forward and adjacent exposure aperture 34. Image receiving sheet 50 is positioned rearwardly of pressure plate 44; flexible strip 52 and leader 54 connect receiving sheet 50 to photosensitive sheet 48. Mask 56 is a continuation of strip 52 and leader 54 connect receiving sheet 50 to photosensitive sheet 48. Mask 56 is a continuation of strip 52 and is bonded to marginal surface areas of sheet 50 and has a rectangular aperture which defines the area throughout which a processing liquid, contained in rupturable container 57, is spread as the photographic materials are advanced from the camera. This configuration of the mask, in turn, defines the ultimate picture area. A pair of spacer strips 58 extend longitudinally of marginal portions of the mask and are bonded thereto so as to cooperate with the mask by providing a given spacing between image receiving sheet 50 and the photosensitive emulsion on sheet 48, after they are brought to superposed position, as will hereafter be described. Tab 68 is connected to photosensitive sheet 46 and facilitates movement thereof to the aforesaid superposed position.

It will be understood that the terms "front," "former," "forward," etc., are here intended to define proximity to, or direction toward, of the camera front and the terms "rear" etc., have the opposite meaning.

Means 20 supports the film pack so that pressure plate 44 locates photosensitive sheet 46 in the focal plane for photographic exposure and locates sheet 50 for movement into superposition with sheet 46 as the photographic materials are withdrawn from the camera.

Heat sink means 26, as shown in FIG. 6, includes plate 86 and 88 of complementarily configuration, joined by hinge means 90. The hinge means may comprise, for example, a strip of tape joining a common edge of plates 86 and 88. Plates 86 and 88 are constructed of a suitable heat conductive material, for example, aluminum.

Figure 4:
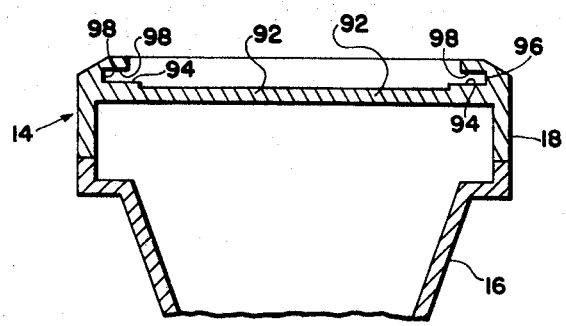
FIG. 4 is a view taken along section 4—4 of FIG. 3.
Figure 5:
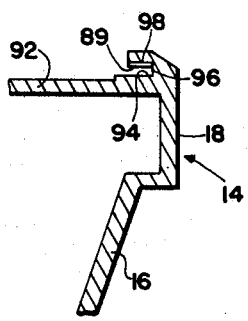
FIG. 5 is a view similar to FIG. 4 illustrating another embodiment.
Figure 7:
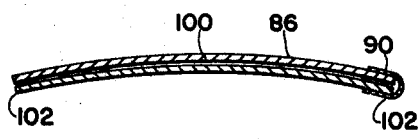
FIG. 7 is a sectional view of another cold clip construction which may be used with this invention.

Means 22 for receiving and storing heat sink means 26 comprises a pair of channels 24 which may be molded into an outer flat surface portion of the camera body, for example, rearwardly of the focal plane upon door 18. Means 22 generally defines a recessed area 92, raised surfaces 94 defining one surface of the channels, upstanding side portions 96 extending from surfaces 94, and surfaces 98 extending perpendicularly from surfaces 96 and over surfaces 94. The width of the channel is determined by the extent of surface 96 and is substantially equal to the thickness of cold clip 26 when plates 86 and 88 are superposed. Means 22 includes open end 89 and back stop 91. The cold clip is securely retained in the storage position by frictional interference between the channel surfaces and plates 86 and 88. This interference may result from tolerances inherent in the manufacture of the channels and cold clip. On the other hand the interference may be provided by a small bead-like rail 89 or the like molded into the channels (see FIG. 5). Alternately, the cold clip itself may be of slightly resilient, non-planar configuration, for example that shown in FIG. 7, so it will frictionally engage the channels. In the embodiment of FIG. 7, plates 86 and 88 are of complementary arcuate shape and arranged so that when inserted in the channels, they flex slightly and apex 100 and base portions 102 of the arch engage surfaces 94 and 98 of the channels.

Operation of the apparatus will now be described. Photosensitive material 48 has been photographically exposed by lens and shutter assembly 12 to form a latent image therein. The tab 68 is pulled manually to perform a first stage of advancement of film assembly components to a second or processing stage. The first stage causes exposed photosensitive material 48 to be brought around the curved extremity of pressure plate 44 to superposition with image receiving sheet 50. Continued pulling of tab 68 against extension 81 of closure 80 pivots the closure to an opening position, against the bias of spring 82, as shown in FIG. 2. Guide portion 78 insures that movement of leader 54 is substantially linear so that it is directed toward and enters margin compressing means 76 and passes within space 84 between rolls 72 and 74, and through opening 77 to a location outside the camera. At the approximate conclusion of these operations, tab 68 separates entirely from the film assembly by reason of the juncture at which the tab is releasably bonded to film leader 54 being drawn in an angular direction markedly away from the plane of the film leader. The actual point of separation is principally determined by the configuration of guide surface 78.

Leader 54 is then pulled manually and steadily to perform the second or processing stage. Container 57 of processing liquid, positioned slightly in advance of the superimposed photosensitive and image receiving surfaces and between the leader and extension of the mask, is drawn between pressure rolls 72 and 74, is ruptured, and the liquid therein is dispersed in the direction of the aforesaid superimposed surfaces. The margin-compressing means 76 holds the marginal areas closely together to prevent escape of any of the liquid between the edges of the superimposed materials. The entire assembly is progressively compressed and withdrawn from the camera. Any excess of the processing liquid is held in trailing areas of the assembly, located exteriorly of the image areas.

When the environment in which the photographic operation is being performed is at or above a temperature for which the photographic material have been designed, for example, about 65° F., photographic development will take place outside the camera in approximately 60 seconds. However, when the temperature is substantially below that for which the photographic materials are designed, the development action is so sluggish that proper development will not occur; prints tend to be dark and color reproduction is not up to acceptable standards. Under these conditions the cold clip 26 is removed from the camera and stored in an inside pocket to absorb heat. Subsequent to removal of the photographic materials from the camera, as desribed above, the warmed cold clip means is removed from the pocket, plates 86 and 88 are pivoted apart, and the superimposed sheets are inserted therebetween and the plates are closed to retain the superimposed sheets in sandwich-like fashion. The "sandwich" should then be re-inserted in a warm pocket for approximately 60 seconds to allow normal development to take place.

After the 60 second interval, the photographic materials are removed from the cold clip and the image receiving layer is separated from the photosensitive layer to yield a finished print. The plates of the cold clip are closed; the plates are then inserted through the open end 89 of channels 24 and slid toward and to back stop 91. The cold clip is retained in the channel by the aforesaid frictional interference between the plates and channels.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic camera of the type utilizing photographic materials adapted to record and develop a photographic image wherein development is initiated upon removal of the photographic materials from said camera, said camera being usable with heat sink means of substantially plate-like configuration for contacting a substantial surface area of said photographic materials subsequent to photographic exposure and after removal thereof from said camera to facilitate said development thereof, comprising:
   (a) retaining means for receiving and storing said heat sink means when said heat sink means is not in use, said retaining means comprising a pair of opposed channels approximately equal in width to the thickness of said heat sink means for receiving and frictionally engaging opposed edges thereof.

2. A photographic camera of the type utilizing photographic materials adapted to record and develop a photographic image wherein development of said image is initiated upon said removal of said materials from said camera, comprising:
   (a) means for supporting said photographic materials for the production of a photographic exposure;
   (b) means for facilitating advance and removal of said materials from said camera, subsequent to exposure, to initiate development of said materials; said camera being usable with heat sink means which include a pair of substantially complementarily configured plates between which said materials may be engaged subsequent to removal thereof from said camera, for facilitating said development thereof; and (c) means defining a pair of channels oriented for receiving and storing said heat sink means when said heat sink means is not in use, the width of said channels being approximately equal to the combined thickness of opposed edges of said pair of plates when said plates are superposed for receiving and frictionally engaging said opposed edges.

3. A photographic camera according to claim 2 wherein said channels comprise:
   (a) means defining a pair of spatially separated, substantially coplanar, surfaces;
   (b) upstanding portions extending substantially perpendicularly of said surfaces, said upstanding portions being spaced apart by a distance slightly greater than a dimension of said plates, for permitting insertion of said plates therebetween; and
   (c) second means defining a second pair of substantially coplanar surfaces extending substantially perpendicularly of said upstanding portions, above the first said pair of substantially coplanar surfaces, said second pair of surfaces being spaced above the first said pair of surfaces by a distance substantially equal to said combined thickness of said edges of said plates for establishing frictional interference between said plates and said first and second surfaces when said plates are inserted between said upstanding portions to securely retain said plates in said channels.

4. A photographic camera according to claim 3 wherein said first or second surfaces include an interference rail to increase frictional interference between said channels and said plates.

5. A photographic camera of the type utilizing photographic materials adapted to record and develop a photographic image wherein development of said image is initiated upon removal of said materials from said camera, comprising:
   (a) means defining an exposure aperture;
   (b) means defining a focal plane;
   (c) a lens and a shutter assembly for directing light from a scene to be photographed upon said focal plane;
   (d) housing means forming a light-tight enclosure for said photographic materials and defining a substantially planar outside surface adjacent said focal plane and on the side thereof opposite said lens and shutter assembly;
   (e) means for supporting said photographic materials in said camera and locating a portion thereof in said focal plane for photographic exposure by light directed upon said focal plane by said lens and shutter assembly;
   (f) means for facilitating advance and removal of said photographic materials from said camera, subsequent to exposure of said portion thereof, to initiate development of said materials; said camera being usable with heat sink means including a pair of substantially complementarily configured plates between which said materials may be engaged subsequent to removal thereof from said camera, for facilitating said development thereof; and
   (g) means on said substantially planar outside surface of said housing means forming a pair of elongated, substantially parallel channels into which said heat sink means may be inserted when not in use, said channels being oriented for slidably receiving opposite edge portions of said heat sink means when said plates are superposed and being characterized by a width approximately equal to the combined thickness of said edge portions of said superposed plates for frictionally retaining said edge portions therein.

References Cited
UNITED STATES PATENTS

| | | | |
|---|---|---|---|
| 2,483,391 | 10/1949 | Gannon | 95—13 |
| 2,576,022 | 11/1951 | Land | 95—13 |
| 2,794,377 | 6/1957 | Fairbank | 95—13 |
| 2,854,905 | 10/1958 | Land | 95—13 |
| 3,121,604 | 2/1964 | Hull | 346—22 |

NORTON ANSHER, Primary Examiner

LEO H. McCORMICK, JR., Assistant Examiner

95—89